(No Model.)

A. J. BLUNTACH.
LAWN MOWER.

No. 561,479.                                    Patented June 2, 1896.

WITNESSES:
Edward Thorpe
J. Redacker

INVENTOR
A. J. Bluntach
BY
Munn & Co.
ATTORNEYS.

UNITED STATES PATENT OFFICE.

ALEXANDER J. BLUNTACH, OF OLIVIA, MINNESOTA.

LAWN-MOWER.

SPECIFICATION forming part of Letters Patent No. 561,479, dated June 2, 1896.

Application filed September 23, 1895. Serial No. 563,398. (No model.)

*To all whom it may concern:*

Be it known that I, ALEXANDER J. BLUNTACH, of Olivia, in the county of Renville and State of Minnesota, have invented a new and useful Improvement in Lawn-Mowers, of which the following is a full, clear, and exact description.

My invention relates to an improvement in lawn-mowers; and the object of the invention is to so construct a lawn-mower that a reciprocating knife forming a portion of the cutting mechanism may be operated by the manipulation of the handles of the machine, and, furthermore, to provide a balance-wheel rotated by a reciprocating movement of the handles, the momentum of which balance-wheel will be utilized to make uniform and regular the propelling-power for the aforesaid reciprocating knife.

Another object of the invention is to so construct the lawn-mower that it will be simple, durable, and light.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
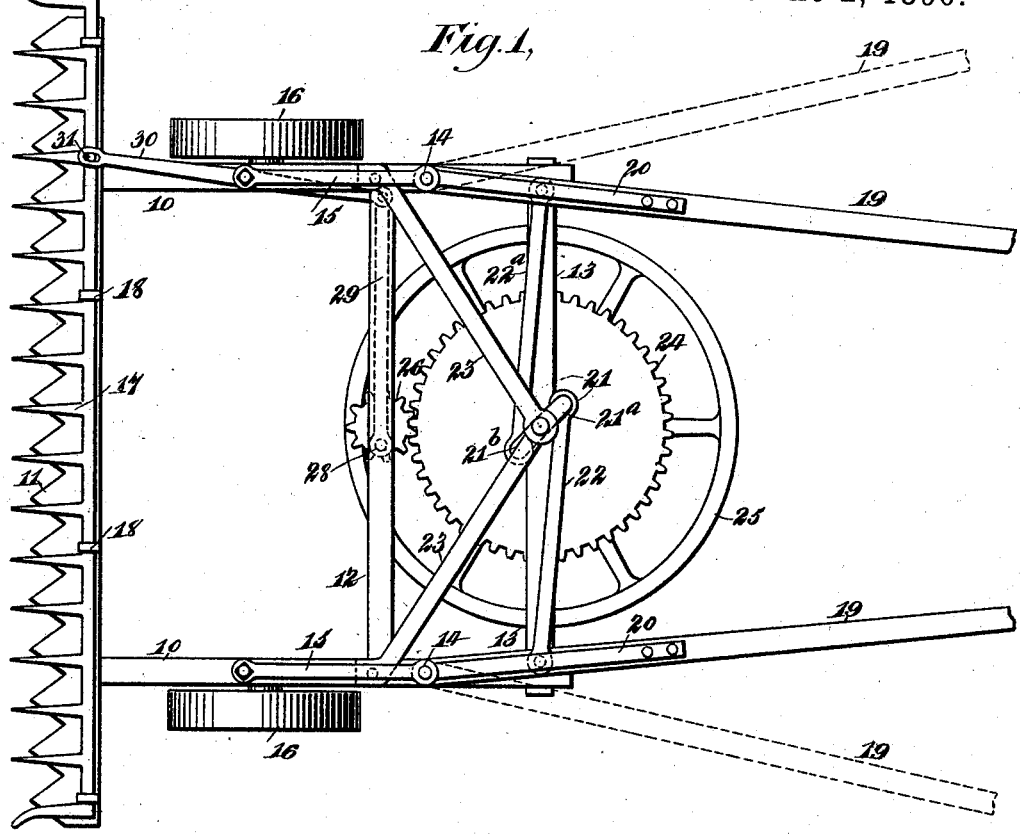
Figure 2:
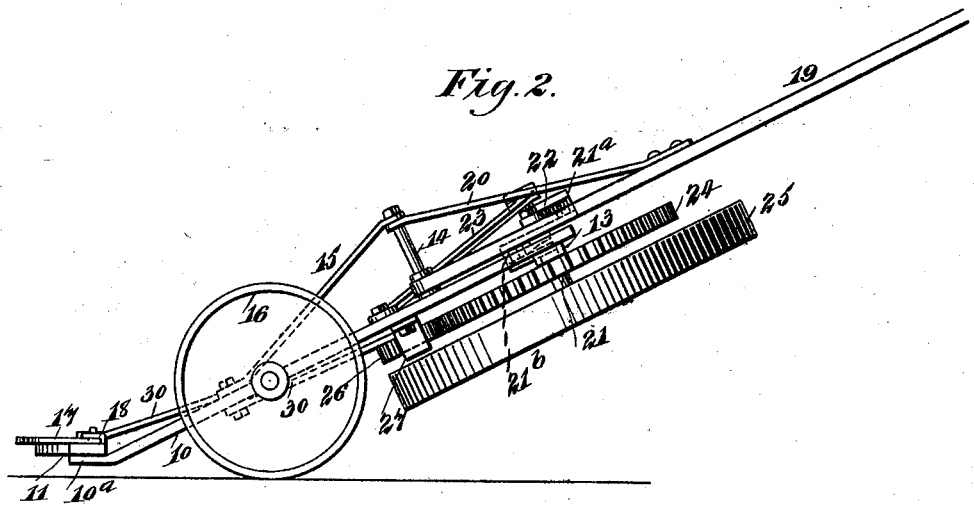

Figure 1 is a plan view of the improved lawn-mower, and Fig. 2 is a side elevation of the same.

In carrying out the invention the main frame of the lawn-mower consists of two side bars 10, which are given an upward and rearward inclination, being each provided at its forward end with a horizontal foot 10ª, and on these feet the stationary knife 11 is secured, the knife being preferably of a saw-tooth pattern. The side bars 10 are connected by two cross-bars 12 and 13, the cross-bar 13 being at or near the upper ends of the side bars and the cross-bar 12 somewhat near their centers.

A pin or post 14 is secured to and projected upward from each of the side bars 10 of the frame, being located, preferably, between the two cross-bars 12 and 13, and the pins or posts are braced or strengthened at their upper ends by tie-rods 15, the latter being secured to the aforesaid side bars of the frame, and each side bar of the frame is provided with a short axle, upon which a carrying-wheel 16 is mounted. A reciprocating knife 17 has guided movement in suitable bearings 18, formed on the back portion of the stationary knife 11, and the teeth of the reciprocating knife are preferably somewhat wedge-shaped, being narrower and longer than the teeth of the fixed slide in order to insure a free and clean cut. The machine is provided with two handles 19, by means of which it is guided, and these handles at their lower ends are each pivoted upon one of the posts 14 of the main frame, turning on the bottom portion of the posts, and braces 20, attached to the handles, are made to turn around the upper portion of the posts.

About centrally of the rear cross-bar 13 of the frame a shaft 21 is journaled, extending above and below the aforesaid cross-bar, and above the cross-bar the shaft 21 has two oppositely-disposed crank-arms formed therein, designated, respectively, as 21ª and 21ᵇ. The upper crank-arm, for example, is connected with a pitman 22, which in its turn is secured, ordinarily, to the upper face of the left-hand handle, while a second pitman 22ª connects the lower crank-arm 21ᵇ preferably with the under face of the right handle 19 of the machine, as is best shown in Fig. 1.

The upper end of the shaft 21 is journaled in eyes formed in brace-bars 23, projected from the side bars 10 of the frame and meeting over the center of the cross-bar 13. A gear 24 is firmly secured on the shaft 21 below the cross-bar 13, and below the said gear a balance-wheel 25 of any desired character is likewise firmly fixed on the aforesaid shaft. The gear 24 is adapted to mesh with a pinion 26, mounted about centrally on the under face of the forward cross-bar 12 of the frame, a suitable stirrup 27 (shown in Fig. 2) being usually employed to steady the spindle of the said pinion. This pinion carries a crank-pin 28, connected with a pitman 29, and the pitman 29 is in its turn connected with a lever 30, extending over the reciprocating knife 17 and provided with an elongated slot at its forward end to receive a pin 31 or an offset produced on the said movable knife, as is clearly shown in Fig. 1. The lever 30, as shown in Fig. 2, under the construction shown in the drawings, is made in two sections, one section being above the right-hand-side bar of the frame and the other section beneath the same, the two sections being connected by a pin serving as the fulcrum of the lever.

The operation of the machine is evident and consists in simply moving the machine forward by means of the handles 19 and at the same time swinging the said handles laterally or moving them alternately toward and then away from one another, as shown in full and dotted lines in Fig. 1. By this movement of the handles the shaft 21 is rotated by the crank-arms formed therein and the gear 24 is revolved, turning the pinion 26, which communicates a reciprocating movement to the movable knife 17, and as the shaft 21 is revolved the balance-wheel 25 will attain a considerable momentum, which will be transferred, through the medium of the said shaft and its connections, to the reciprocating knife, imparting to the said knife not only considerable speed but also great power.

The machine is exceedingly simple and economic in its character and is, furthermore, very light in its build.

Having thus described my invention, I claim as new and desire to secure by Letters Patent—

1. In a lawn-mower, the combination, with a frame, of a fixed and a reciprocating knife, handles pivoted to the said frame, and capable of movement to and from each other, a crank-shaft the crank-arms of which are connected to the handles, a balance-wheel driven by the crank-shaft, gearing driven from the crank-shaft, and a connection between the said gearing and the reciprocating knife, substantially as described.

2. In a lawn-mower, the combination, with a wheeled frame of a fixed and a reciprocating knife carried thereon handles pivoted to the frame and having lateral movement to and from each other, a shaft provided with crank-arms oppositely disposed and having pitman connection with the said handles, a gear, a balance-wheel driven by the crank-shaft, a pinion meshing with the said gear, a lever connected with the reciprocating knife, and a pitman connection between the said lever and the said pinion, as and for the purpose set forth.

3. In a lawn-mower, the combination with a wheeled frame, of a movable blade carried on the frame, two handles pivotally mounted on the frame and capable of movement toward and from each other, a gear-wheel, a crank-shaft on which the gear-wheel is carried, connections between the crank-shaft and handles, and means for transmitting movement from the gear-wheel to the blade, substantially as described.

4. In a lawn-mower, the combination with a wheeled frame, of a handle pivotally mounted thereon and capable of lateral pivotal movement, a movable blade on the frame, a crank-shaft, a link connecting the crank-shaft and the handle, a gear driven by the crank-shaft, a lever fulcrumed on the frame and connected to the blade, and a connection between the gear and the lever for driving the latter, substantially as described.

ALEXANDER J. BLUNTACH.

Witnesses:
HENRY H. NEUENBURG,
W. D. CARSON.